Jan. 15, 1924.
J. H. McCORMICK, JR
1,481,020
ANTISKID CHAIN
Filed Dec. 29, 1922
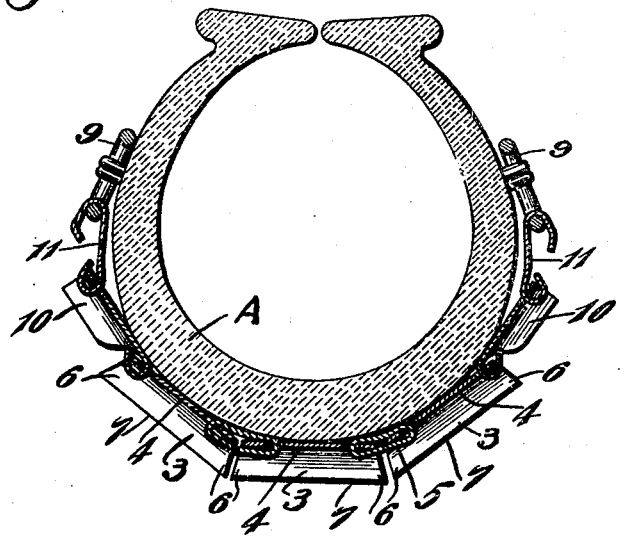
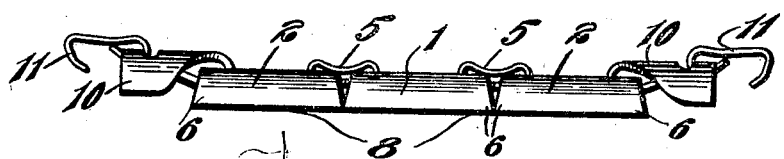
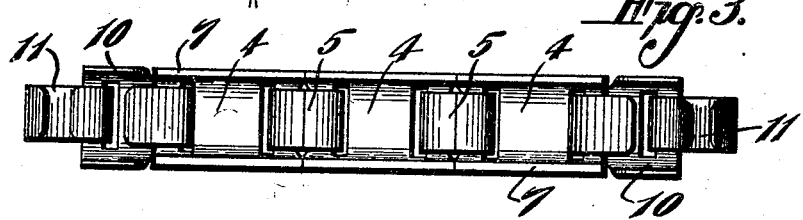
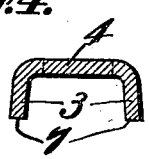
Inventor:
JOHN H. McCORMICK JR.

Patented Jan. 15, 1924.

1,481,020

UNITED STATES PATENT OFFICE.

JOHN H. McCORMICK, JR., OF ST. LOUIS, MISSOURI.

ANTISKID CHAIN.

Application filed December 29, 1922. Serial No. 609,638.

*To all whom it may concern:*

Be it known that I, JOHN H. McCORMICK, Jr., a citizen of the United States, residing at St. Louis, Missouri, have invented a certain new and useful Improvement in Antiskid Chains, of which the following is a full, clear, and exact description, such as will enable others skilled in the art to which it appertains to make and use the same, reference being had to the accompanying drawings, forming part of this application.

My invention relates to anti-skid chains such as are used on automobile tires, the particular object of my invention being to provide an improved chain which will more securely engage the road surface, will maintain its flexibility, and will possess a longer life than the chains heretofore used.

I secure these objects by forming the central portions of the chains of channel shaped links, the flanges of which links practically abut each other lengthwise and the longitudinal edges of which form a substantially continuous tread surface, spaced from the webs of the links. The links are united by connections of flat strips spaced through transverse slots in the webs of the links and bent back adjacent to the inner face of the link web and are accordingly spaced from the road surface and not subject to wear and distortion which would tend to destroy the hinge-like assembly of the links.

In the accompanying drawings which illustrate a selected embodiment of my invention—

Figure 1 is a transverse section through a tire upon which one of my cross chains is placed and showing the tire fully inflated.

Figure 2 is a side elevation of one of my cross chains arranged in a straight line.

Figure 3 is a bottom view of the cross chain shown in Figure 2.

Figure 4 is a transverse section through one of the principal links of the chain illustrated in the other figures.

For the average size tire, practically all of the non-skid functioning will be performed by the middle link 1 and the adjacent side link 2 on each side of the middle link. These links are channel-shape in cross section and the flanges 3 of the links are a substantial depth so as to space the webs 4 from the roadway and thereby protect the connecting clips 5. The ends 6 of each link flange are cut diagonally so that the outer edge 7 of each flange is somewhat longer than the web of the link. This shaping of the ends of the flanges serves to increase the tread portion of each link and reduce the space between the flanges of adjacent links. With the tire fully inflated and not sufficient weight thereon to depress the tread surface, as shown in Figure 1, the ends of the link flanges will separate slightly and be substantially parallel. As the tire is depressed at its tread, the chain is straightened and the ends of the link flanges approach each other until, in the extreme position shown in Figure 2, the ends of the flanges contact and form a continuous tread surface 8.

It will be noted that the upper faces of connecting clips 5 are concaved lengthwise to accommodate the tire A and also accommodate the lengthwise curving of the chain. Each end of the cross chain illustrated is connected to a peripheral chain 9 by means of links 10 and 11 which form no part of my present invention and may be of any suitable type, these links usually having no anti-skid functions although if the tire should be of a shape or size rendering advantageous the presence of more than three functioning links, the preferred form of link may be increased in number, as desired.

The construction of my chain is such that wear which will destroy the ordinary chain will only reduce the depth of flanges 3 to an extent where they are still deep enough to protect the webs and connecting clips. At all times there is a continuous metal band across the tire and not an open link surface into which particles of ice, rock, etc., may be projected and forced into the tire. Nor are there any spaces between adjacent links along the tire into which the tire may project and be pinched by relative movement of the links.

The construction illustrated and described is an economical one, there being very little waste of material and very simple assembling operations. It will be noted that the main links are identical and that no selection is required in assembling them.

I contemplate such modifications of the exact contour and formation of my links as fall within the scope of the following claims defining my invention.

I claim:

1. In an anti-skid chain, a plurality of channel-shaped links, each link having flanges of substantial depth extending from end to end of the link, the web of each link being provided with transverse slots spaced respectively from its ends, and connecting clips of flat material passed through adjacent slots of adjacent links and having return bends lying close to the webs of said links.

2. In an anti-skid chain, a plurality of channel-shaped links, each link having flanges of substantial depth extending from end to end of the link, the web of each link being provided with transverse slots spaced respectively from its ends, and connecting clips of flat material passed through adjacent slots of adjacent links and having return bends lying close to the webs of said links, each link being straight from end to end and each clip being concaved to fit the transverse contour of a pneumatic tire.

3. In an anti-skid chain, a plurality of channel-shaped links, clips pivotally connecting the webs of adjacent links, the backs of said links and clips being adapted to engage a tire, each of said links having flanges of substantial width, the ends of said flanges extending diagonally outwardly so that the longitudinal edges of said flanges are longer than the webs of the links whereby when the chain is placed across a tire the tread surface provided by said edges will be longer transversely of the tire than the length of the backs of said links and clips.

In testimony whereof I hereunto affix my signature this 14th day of December, 1922.

JOHN H. McCORMICK, Jr.